United States Patent
Takata

(10) Patent No.: US 7,884,552 B2
(45) Date of Patent: Feb. 8, 2011

(54) ELECTRICAL DISCHARGE TUBE, ILLUMINATION APPARATUS FOR DISPLAY DEVICE, LIQUID CRYSTAL DISPLAY DEVICE, AND LIQUID CRYSTAL DISPLAY TELEVISION

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 323 days.

(21) Appl. No.: 12/089,968

(22) PCT Filed: Jul. 3, 2006

(86) PCT No.: PCT/JP2006/313210

§ 371 (c)(1),
(2), (4) Date: Apr. 11, 2008

(87) PCT Pub. No.: WO2007/060762

PCT Pub. Date: May 31, 2007

(65) Prior Publication Data
US 2009/0244396 A1 Oct. 1, 2009

(30) Foreign Application Priority Data
Nov. 22, 2005 (JP) ............................. 2005-337277

(51) Int. Cl.
*H01J 13/32* (2006.01)
*H05B 37/02* (2006.01)

(52) U.S. Cl. ...................... 315/115; 315/309; 315/312; 349/70

(58) Field of Classification Search ................. 315/112, 315/115, 116, 246, 283, 291, 307, 309, 312, 315/324; 349/70; 348/790, 798; 345/102
See application file for complete search history.

(56) References Cited

U.S. PATENT DOCUMENTS 4,487,481 A * 12/1984 Suzawa ....................... 349/67
5,274,305 A * 12/1993 Bouchard ................... 315/108

(Continued)

FOREIGN PATENT DOCUMENTS

JP   58-165851 U   11/1983

(Continued)

OTHER PUBLICATIONS

Official communication issued in counterpart International Application No. PCT/JP2006/313210, mailed on Sep. 26, 2006.

(Continued)

*Primary Examiner*—Thuy Vinh Tran
(74) *Attorney, Agent, or Firm*—Keating & Bennett, LLP

(57) ABSTRACT

A backlight device includes a hot cathode fluorescent tube having a pair of electrodes, a power source arranged to apply voltage having an alternating component to at least one of the pair of electrodes, and an electrode heating circuit arranged to supply heating current to the electrodes. The backlight device further includes temperature sensors that detect the temperatures in the electrodes to be supplied with the heating current. Based on the results detected by the temperature sensors, a switch element is driven by the control section. The heating current is thus controlled. With this, the temperatures in the electrodes of the electrical discharge tube can be more accurately grasped, and the temperatures in the electrodes of the discharge tube can be more properly controlled.

5 Claims, 8 Drawing Sheets

U.S. PATENT DOCUMENTS

| | | | |
|---|---|---|---|
| 7,012,376 B2 * | 3/2006 | Yamashita et al. | 315/46 |
| 7,161,312 B2 * | 1/2007 | Blum | 315/312 |
| 2004/0150601 A1 * | 8/2004 | Baek et al. | 345/98 |

FOREIGN PATENT DOCUMENTS

| | | | |
|---|---|---|---|
| JP | 62-036966 A | 2/1987 | |
| JP | 05-242989 A | 9/1993 | |
| JP | 06-068858 A | 3/1994 | |

OTHER PUBLICATIONS

English Language Translation of JP 62-036966 A.

* cited by examiner

ELECTRICAL DISCHARGE TUBE, ILLUMINATION APPARATUS FOR DISPLAY DEVICE, LIQUID CRYSTAL DISPLAY DEVICE, AND LIQUID CRYSTAL DISPLAY TELEVISION

BACKGROUND OF THE INVENTION

1. Field of the Invention

The present invention relates to an electrical discharge tube, an illumination apparatus for a display device, a liquid crystal display device, and a liquid crystal display television.

2. Description of the Related Art

A liquid crystal panel for use with a liquid crystal display device such as a liquid crystal display television does not emit light by itself, and therefore needs an illumination apparatus for the display device separately as an external lamp, which is a so-called a backlight device. The backlight device is installed on the backside or on the side of the liquid crystal panel, and generally includes a metal base, a plurality of electrical discharge tubes, and a plurality of optical elements. The metal base has an open face on the liquid crystal panel side. The electrical discharge tubes are accommodated as lamps in the base. The optical elements (a diffuser plate and the like) are disposed over the open face of the base to efficiently pass light emitted by the electrical discharge tubes to the liquid crystal panel side.

Meanwhile, as the discharge tube used with such an illumination apparatus for the display device, a hot cathode fluorescent lamp is used in some cases. The hot cathode fluorescent lamp has emitter electrodes on both sides thereof. The emitter electrodes start discharging by being applied with discharging voltage therebetween while being heated. A lighting circuit for such a hot cathode fluorescent tube is disclosed, for example, in Japanese Unexamined Patent Application Publication No. 5-242989. The publication discloses a device wherein, apart from a circuit for generating discharging voltage, a heating circuit that has a switching element and supplies current to emitter electrodes is provided. In the device, the switching element is intermittently switched for saving power.

With this type of a lighting circuit for the discharge tube, the longer the switched off state of the switching element continues, the more it contributes to the power saving. In some cases, however, the longer duration of the switched off state causes too much decrease in temperature in the emitter electrodes and decrease in the amount of the radiated thermoelectrons, and thus the discharge cannot be maintained. On the other hand, with longer duration of the switched on state of the switching element, it is impossible to save power. With longer duration of the switched on state, furthermore, the emitters are more wasted, and the life of the discharge tube is shortened.

Despite this, the switching control of the device disclosed in the above publication is operated based on a prediction of decrease in temperature after the power supply to the emitter electrodes is stopped. Therefore, with a construction wherein the actual temperatures in the emitter electrodes are affected by the current that flows through the emitter electrodes (that differs in every discharge tube) or external factors, it is difficult to keep the temperatures in the emitter electrodes in a most preferable state.

SUMMARY OF THE INVENTION

In order to overcome the problems described above, preferred embodiments of the present invention accurately hold and control temperatures in the electrodes in the electrical discharge tube.

An electrical discharge tube in accordance with a preferred embodiment of the present invention includes a pair of electrodes that is supplied with voltage having an alternating component from a power source and is supplied with heating current from an electrode heating circuit, a tubular member that accommodates the pair of electrodes therein, and a temperature sensor that outputs a detection signal based the temperature in at least one of the electrodes. The detection signal is arranged to be supplied to a controller that controls the heating current. Also, in an illumination apparatus using the electrical discharge tube, the heating current is controlled based on results detected by the temperature sensor.

According to this construction, the temperatures in the electrodes of the discharge tube can be more accurately grasped, and the temperatures in the electrodes of the discharge tube can be more properly controlled.

It is preferable that the electrical discharge tube is a hot cathode tube. A hot cathode tube has characteristics such that higher brilliance is obtained with comparatively lower voltage. However, the hot cathode tube has a problem that the electrodes are easy to be deteriorated and has a shorter life. That is, the emitter on the surface of the electrodes of the hot cathode tube is easy to vaporize at too high of a temperature; and, on the other hand, sputtering away of the particles of the emitter easily occurs at too low of a temperature.

When the foregoing construction is used for such a hot cathode tube, the temperatures in the electrodes are easily controlled with higher accuracy. This makes easier to prevent the vaporization and/or sputtering away of the emitter.

Also, when the temperature sensor is constituted by a thermocouple in the electrical discharge tube, excellent temperature detection at the electrodes, which are put in a higher temperature state, is enabled.

Other features, elements, processes, steps, characteristics and advantages of the present invention will become more apparent from the following detailed description of preferred embodiments of the present invention with reference to the attached drawings.

BRIEF EXPLANATION OF THE DRAWINGS

FIG. 6 is a block diagram conceptually illustrating an liquid crystal display television configured by using the liquid crystal display device illustrated in FIG. 1 and the like.

DETAILED DESCRIPTION OF THE PREFERRED EMBODIMENTS

First Preferred Embodiment

A first preferred embodiment of the present invention will be explained with reference to drawings.

General Construction

Figure 1:
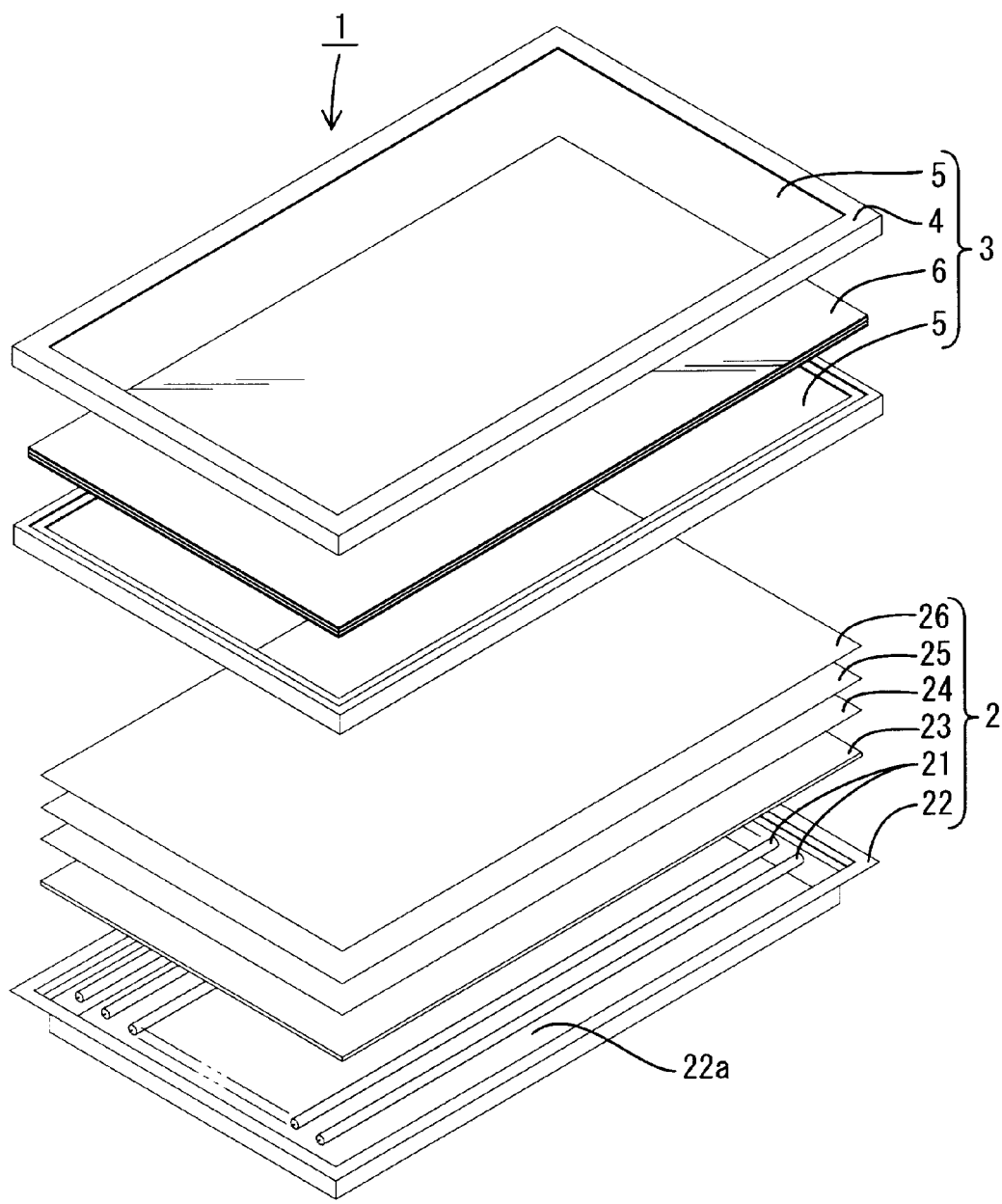
FIG. 1 is a perspective view conceptually illustrating a liquid crystal display in accordance with a first preferred embodiment of the present invention.

A liquid crystal display 1 in accordance with the present preferred embodiment corresponds to a display device of the present invention. The liquid crystal display 1 includes a backlight device 2 (the backlight device 2 corresponds to an illumination apparatus for a display device) and a display panel 3. The display panel 3 (the display panel 3 corresponds to a liquid crystal panel) is disposed in front of the backlight device and can display images. The backlight device 2, though it is not limited to this, is a so-called direct backlight device that includes a tray 22 that accommodates a plurality of hot cathode fluorescent tubes 21, a light guide plate 23 made of synthetic resin and disposed immediately above the tray 22, a diffuser sheet 24 disposed on the light guide plate 23, and two lens sheets 25, 26 disposed on the diffuser sheet 24. As illustrated in FIG. 1, the diffuser sheet 24 and the lens sheets 25, 26 preferably are formed of synthetic resin and each are substantially rectangular in a two-dimensional view, and form a sheet laminate.

As illustrated in FIG. 1, provided in the tray 22 is a reflector sheet 22*a*. The plurality of hot cathode tubes 21 are positioned on the reflector sheet 22*a*. The hot cathode tubes 21 are disposed in the tray 22 and are equally spaced in parallel with each other. The hot cathode tubes collectively have a planar shape. The display panel 3 includes two glass substrates 5 each fitted in respective frames 4, and a panel substrate 6 that is set between the glass substrates 5. The panel substrate 6 is constituted by a pair of transparent electrodes and alignment layers having liquid crystal therein.

Electrical Configuration

The backlight device 2 includes the hot cathode fluorescent tubes and respective power source circuits 70. Each of the hot cathode fluorescent tubes is an electrical discharge tube including a pair of electrodes 33, 34. Each of the power source circuits 70 is arranged to apply voltage having an alternating component to the electrodes 33, 34. The pair of electrodes 33, 34 are provided with an electrode heating circuit 38 for supplying heating current. The power source circuit 70 may be any configuration for generating AC voltage. In this case, it is constituted by an inverter circuit. Each of the electrodes 33, 34 is constituted by a filament made of metal such as tungsten and the like.

Figure 2:
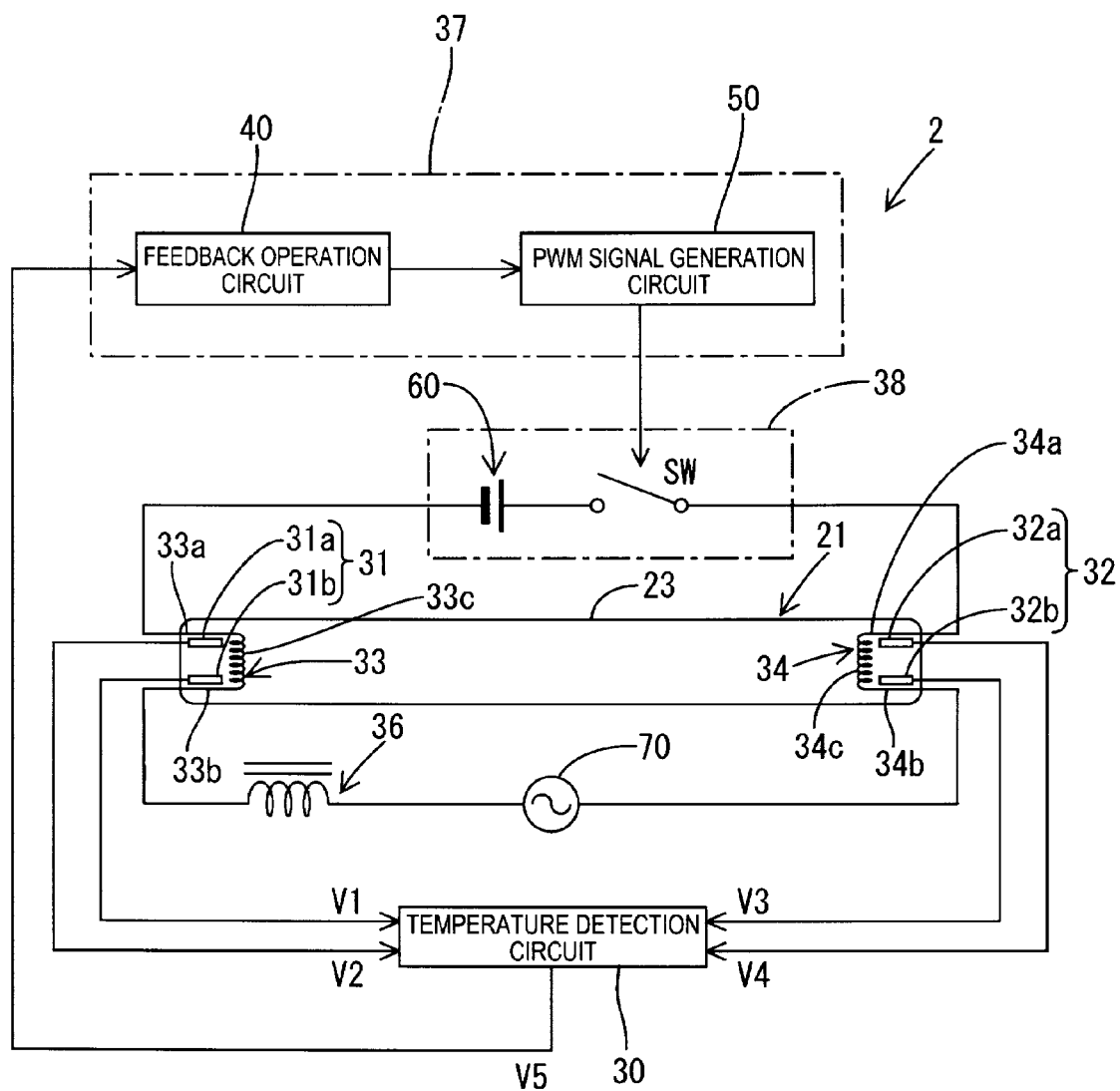
FIG. 2 is a block diagram illustrating an electrical construction of a backlight device in a liquid crystal display device in accordance with the first preferred embodiment.

Note that the electrodes 33, 34 are coated with a cathode emissive substance(s) (emitter) composed of oxide such as Ba, Sr, Ca, Zr, and/or the like. The hot cathode fluorescent tube includes a tubular member 23 made of soft glass (soda-lime glass, lead glass, or the like) and the like. The tubular member 23 is translucent and has a cylindrical shape. A sealing member (illustration in FIG. 2 is omitted) is provided at each end of the tubular member 23 so as to seal the respective end of the tubular member 23.

Figure 5:
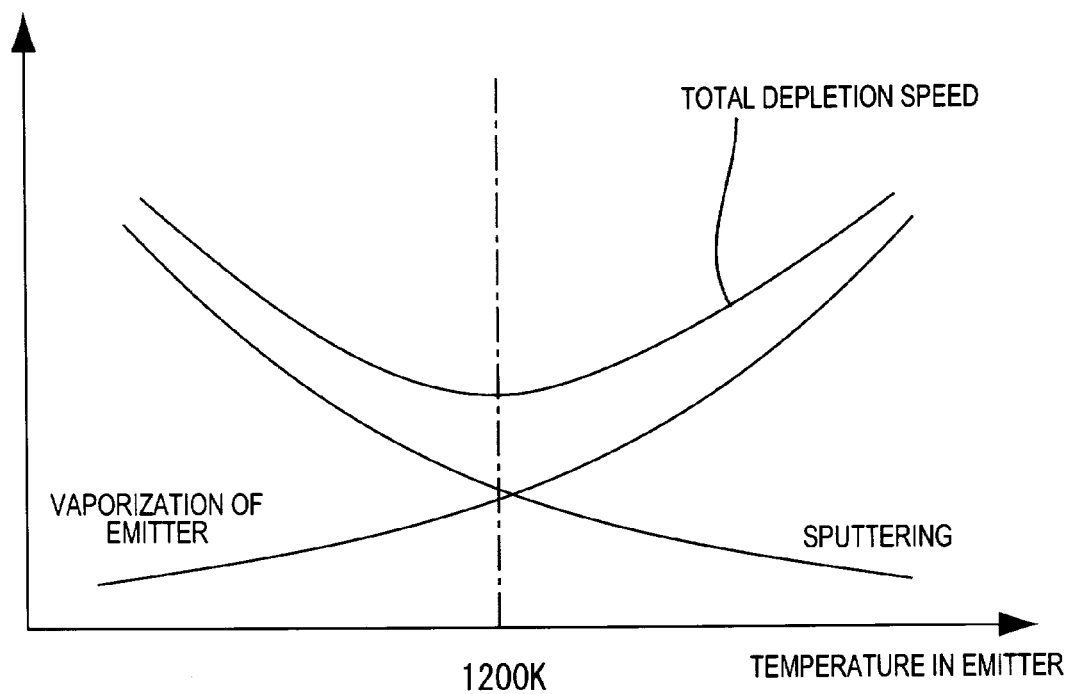
FIG. 5 is a graph showing a relation between the temperatures in an emitter electrode and the consumption speeds of the emitter.

Referring to the hot cathode fluorescent tube 21 used with the backlight device 2 in accordance with the present preferred embodiment, the hot cathode fluorescent tube 21 has characteristics that higher brightness can be obtained with comparatively lower voltage. The hot cathode fluorescent tube 21, however, has a problem that the electrodes are easily deteriorated and have a shorter life. That is, the foregoing emitter is scattered away or vaporized by ion bombardment at the time when the lamp is started, electron bombardment and heat at the time when the lamp is staying on, and the like. When the emitter is thus entirely depleted, the lamp ends. As shown in FIG. 5, the emitter has characteristics easily vaporizing at too high of a temperature. Accordingly, from a standpoint of preventing the vaporization of the emitter, it is not preferable to set the temperature in the electrode too high. On the other hand, as shown likewise in FIG. 5, when the temperature in the electrode is too low, the particles of the emitter are liable to be sputtered away by electron bombardment. That is, the total depletion speed of the emitter is considered to be the lowest in a case where the temperature in the emitter is at a proper temperature (1200K in FIG. 5) that is neither too high nor too low.

In the present preferred embodiment, aiming at the foregoing points, a configuration for controlling the temperature in the electrodes 33, 34 in a proper temperature that is neither too high nor too low is realized to restrain the depletion of the emitter. Specifically, the backlight device 2 includes temperature sensors 31, 32 to detect the temperatures in the electrodes 33, 34 to be supplied with heating current, and based on the results detected by the temperature sensors 31, 32, a control section 37 (corresponding to a controller) controls the heating current. Thus, control of the heating current is operated based on the results detected by the temperature sensors 31, 32, and therefore the temperatures in the electrodes are controlled with higher accuracy to realize both prevention of vaporization and prevention of sputtering away of the emitter. The lifetimes of the electrodes are thus enhanced.

The electrode heating circuit 38 includes a DC power source 60 (corresponding to a heating power source) and a semiconductor switch element SW (referred hereinafter also as a switch element SW) such as FET, IGBT, or the like. The DC power source 60 is arranged to supply heating current to the electrodes 33, 34, while the switch element SW is configured to perform a switching operation based on PWM signals from a PWM signal generation circuit 50 that constitutes a portion of the control section 37. Note that control of the heating current will be explained below.

Each of the temperature sensors 31, 32 includes a thermocouple (e.g., platinum-rhodium thermocouple, or the like) so as to accurately detect the temperature in the electrodes that are put in a high temperature state. These temperature sensors 31, 32 are disposed in a tube of the hot cathode fluorescent tube 21 (i.e., inside the tubular member 23) so as to be less affected by the exterior.

Figure 3:
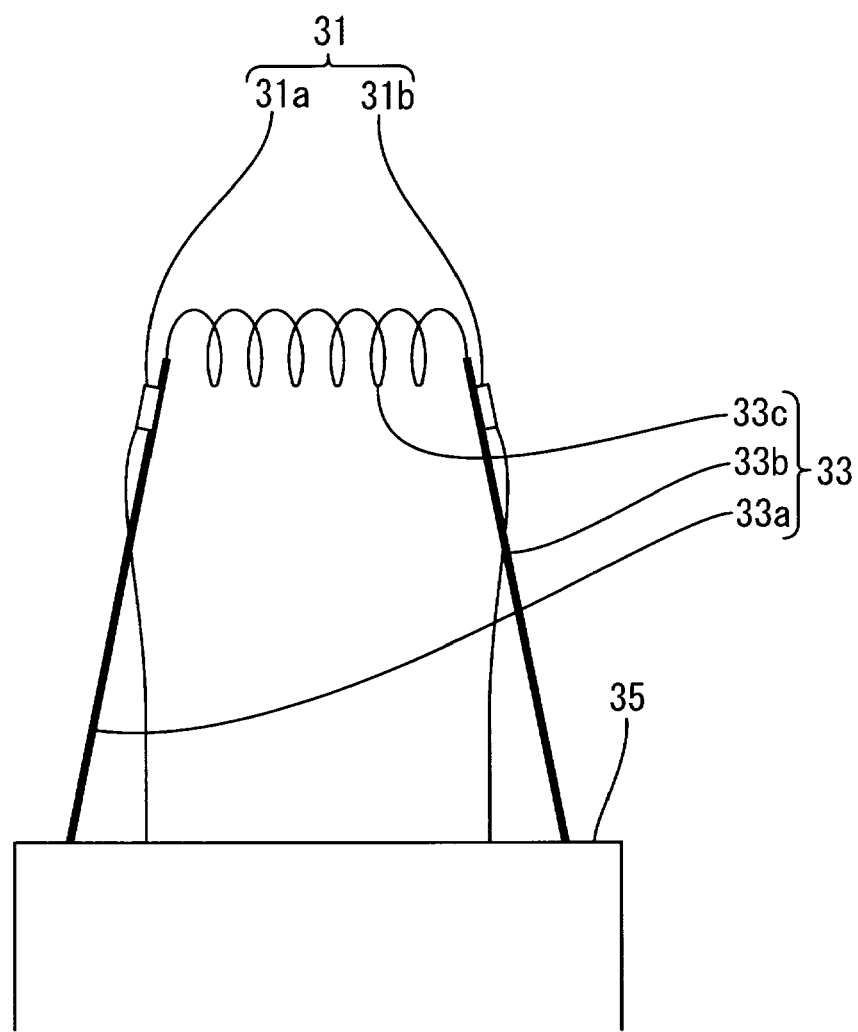
FIG. 3 is a side view conceptually illustrating one of electrodes of a hot cathode tube.

Next, the disposition of the temperature sensors 31, 32 are explained with reference to the electrode 33 that is one of the pair of electrodes 33, 34. Each end of the tubular member 23 of the hot cathode fluorescent tube 21 is sealed with the sealing member, and a stem 35 as illustrated in FIG. 3 constitutes a portion of the sealing member. The stem 35 constitutes an inner wall of the sealing member and, not necessarily the same with the illustration in FIG. 3, may have any shape or configuration to support the electrode.

The electrodes 33, 34 each extend from the respective stems 35 provided at both ends of the hot cathode fluorescent tube 21. FIG. 3 illustrates the stem 35 provided at the electrode 33 side. A pair of leads 33*a*, 33*b* extend from the stem 35, and a filament 33*c* bridges the leads 33*a* and 33*b*.

The temperature sensor 31 is attached to the leads 33*a*, 33*b*. Specifically, the temperature sensor 31 includes a first temperature detection element 31a attached to one of the leads 33a, 33b and a second temperature detection element 31b attached to another one of the leads 33a, 33b. Each of the first temperature detection element 31a and the second temperature detection element 31b are attached to one of the leads 33a, 33b at a position adjacent to the filament 33c.

Note that FIG. 3 illustrates the configuration of the stem 35, the pair of leads 33a, 33b, and the filament 33c at the electrode 33 side, and they are configured likewise at the electrode 34 side. That is, also at the electrode 34 side, a stem (not illustrated) similar to the one shown in FIG. 3, a pair of leads 34, 34b (diagrammatically illustrated in FIG. 2), and a filament 34c (diagrammatically illustrated in FIG. 2) are provided.

The temperature sensor 32 is configured similarly to the temperature sensor 31 illustrated in FIG. 3. Specifically, the temperature sensor 32 includes a first temperature detection element 32a attached to the lead 34a, which is one of the pair of leads 34a, 34b, and a second temperature detection element 32b attached to the lead 34b. The first temperature detection element 32a and the second temperature detection element 32b are configured similarly to the first temperature detection element 31a and the second temperature detection element 31b illustrated in FIG. 3, with each of them being attached to one of the leads 23a, 34b at the portion adjacent to the filament 34c (not illustrated).

The temperature detection circuit 30 is configured to obtain temperature signals from the temperature detection elements 31a, 31b, 32a, 32b each and output a signal of an average temperature of the detected temperatures. In the illustration in FIG. 2, it is arranged such that the temperature detection elements 31a, 31b, 32a, 32b each input voltage respective signals V1, V2, V3, V4 corresponding to the detected temperatures to the temperature detection circuit 30, and the temperature detection circuit 30 outputs a voltage signal V5 corresponding to the average temperature. The temperature detection circuit 30 may be constituted by an averaging circuit that outputs an average voltage of a plurality of voltages, an A/D converter with a CPU, or the like. The voltage signal V5 indicating the average temperature is arranged to be input to the control section 37. Note that reference numeral 36 indicates a ballast.

The control section 37 will be now explained.

The control section 37 includes a feedback operation circuit 40 and the PWM signal generation circuit 50.

Figure 4:
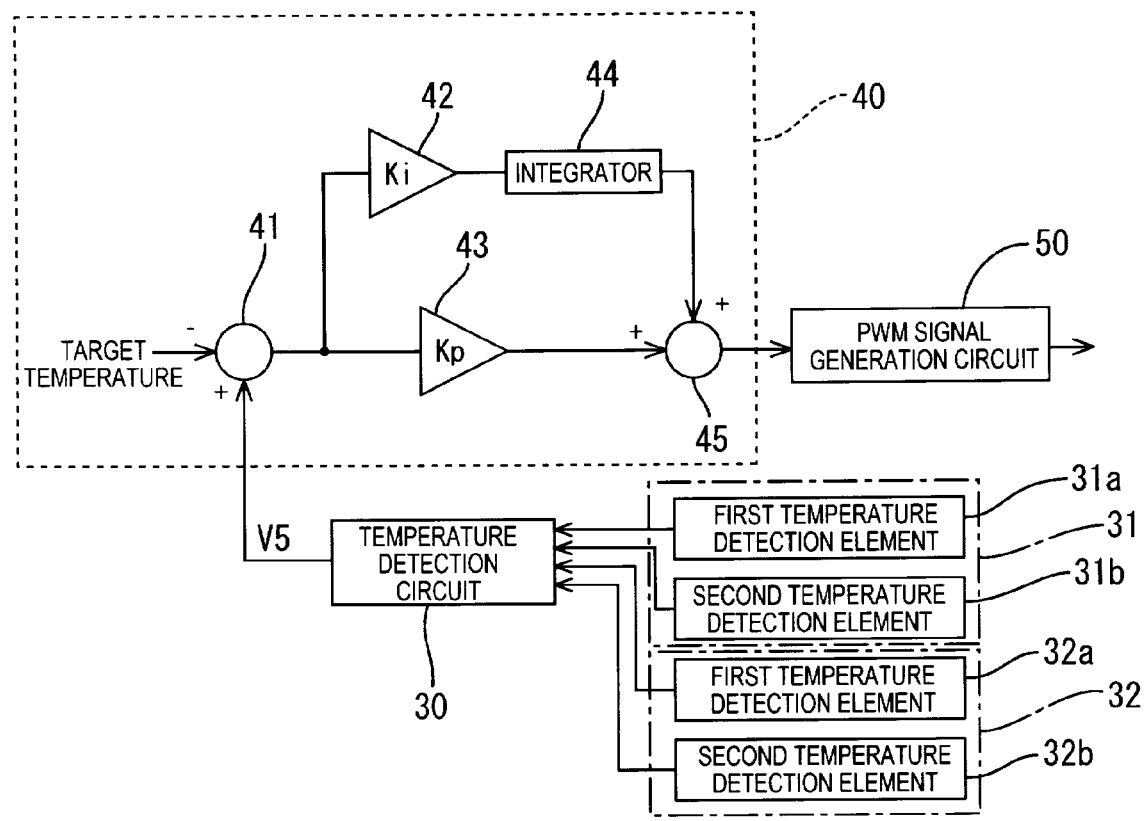
FIG. 4 is a block diagram conceptually illustrating an inner construction of a feedback operation circuit of FIG. 2.

As conceptually illustrated in FIG. 4, the feedback operation circuit 40 is configured to determine a value to output based on a target value and the temperature signal V5 received from the temperature detection circuit 30, and output the value to the PWM signal generation circuit. The case illustrated in FIG. 4 is configured to perform a PI control based on an existing temperature and the target temperature.

In the present preferred embodiment, the signal V5 corresponding to the average value of the values detected by the first temperature detection elements 31a, 32a and the values detected by the second temperature detection elements 31b, 32b is input as the existing temperature to the feedback operation circuit 40 of the control section 37. Based on the average value of these detected values, a feedback control amount is determined, and the heating current is controlled with a PWM signal corresponding to the control amount.

The feedback operation circuit 40 includes a subtracter 41, an integration operator 42, and an integrator 44. The subtracter 41 finds a temperature deviation of the detected existing temperature (the temperature indicated by the voltage signal V5) from the target temperature. The integration operator 42 multiplies the temperature deviation with an integral gain. The integrator 44 finds an integrated value of the operated value found by the integration operator 42, thereby computing an integral control value. The feedback operation circuit 40 also includes a proportion operator 43 that multiplies the temperature deviation with a proportional gain, thereby computing a proportional control value. Finally, a sum of the integral control value and the proportional control value is computed as a control amount (a command value).

Note that, in the case of FIG. 4, the subtracter 41 is constituted by a known subtraction circuit, and the integration operator 42 and the proportion operator 43 each are constituted by known respective multiplication circuits. Furthermore, the integrator 44 is constituted by a known integration circuit. Each of the proportional gain used in the proportion operator 43 and the integral gain used in the integration operator 42 is arranged to be a predetermined constant value.

Note that any other configuration to perform the PI control based on the existing temperature and the target temperature may be used. For example, the feedback operation circuit 40 may be realized with a CPU with a program to perform the PI control.

The control amount (the command value) computed by the feedback operation circuit 40 is input to the PWM signal generation circuit 50. The PWM signal generation circuit 50 is arranged to output the PWM signal of a duty ratio corresponding to the control amount inputted thereto. The PWM signal generation circuit 50 is constituted by a known PWM circuit, however, it may be realized with a microcomputer or the like.

Also, although FIG. 2 illustrates the configuration wherein the feedback operation circuit 40 and the PWM signal generation circuit 50 are separately provided for explanation, they may be realized with a single element. For example, the entire control section 37 may be constituted by a microcomputer so that the microcomputer performs the feedback operation (the PI operation) while computing the feedback control amount, and outputs the PWM signal in accordance with the feedback control amount.

Furthermore, although the case of FIG. 4 illustrates the configuration wherein the PI control is performed, any other control system (e.g., a PID control) to perform the feedback operation may be used.

The electrode heating circuit 38 is configured to supply heating current to both of the electrodes 33, 34. The electrodes 33, 34 each have the foregoing respective temperature sensors 31, 32 attached thereon. Based on the values detected by the temperature sensors 31, 32 on the electrodes 33, 34, the control section 37 controls the heating current.

The electrode heating circuit 38 is controlled based on the PWM signal that is outputted from the PWM signal generation circuit 50. That is, based on the PWM signal outputted from the PWM signal generation circuit 50, the semiconductor switch SW is driven, and a duty ratio control is performed. Thus, the duty ratio is controlled in accordance with the outputs (the detected values) of the temperature sensors 31, 32, and heating current is controlled by the control of the duty ratio.

Note that the backlight device 2 may have a plurality of sets of the hot cathode fluorescent tube 21 and the peripheral circuit (the temperature detection circuit 30, the electrode heating circuit 38, and the control section 37) as explained above. For example, in a case where the backlight device is to include three hot cathode fluorescent tubes 21, three sets of the configuration as illustrated in FIG. 2 may be provided.

A liquid crystal display television 100 using the foregoing liquid crystal display will be now explained.

Figure 6:
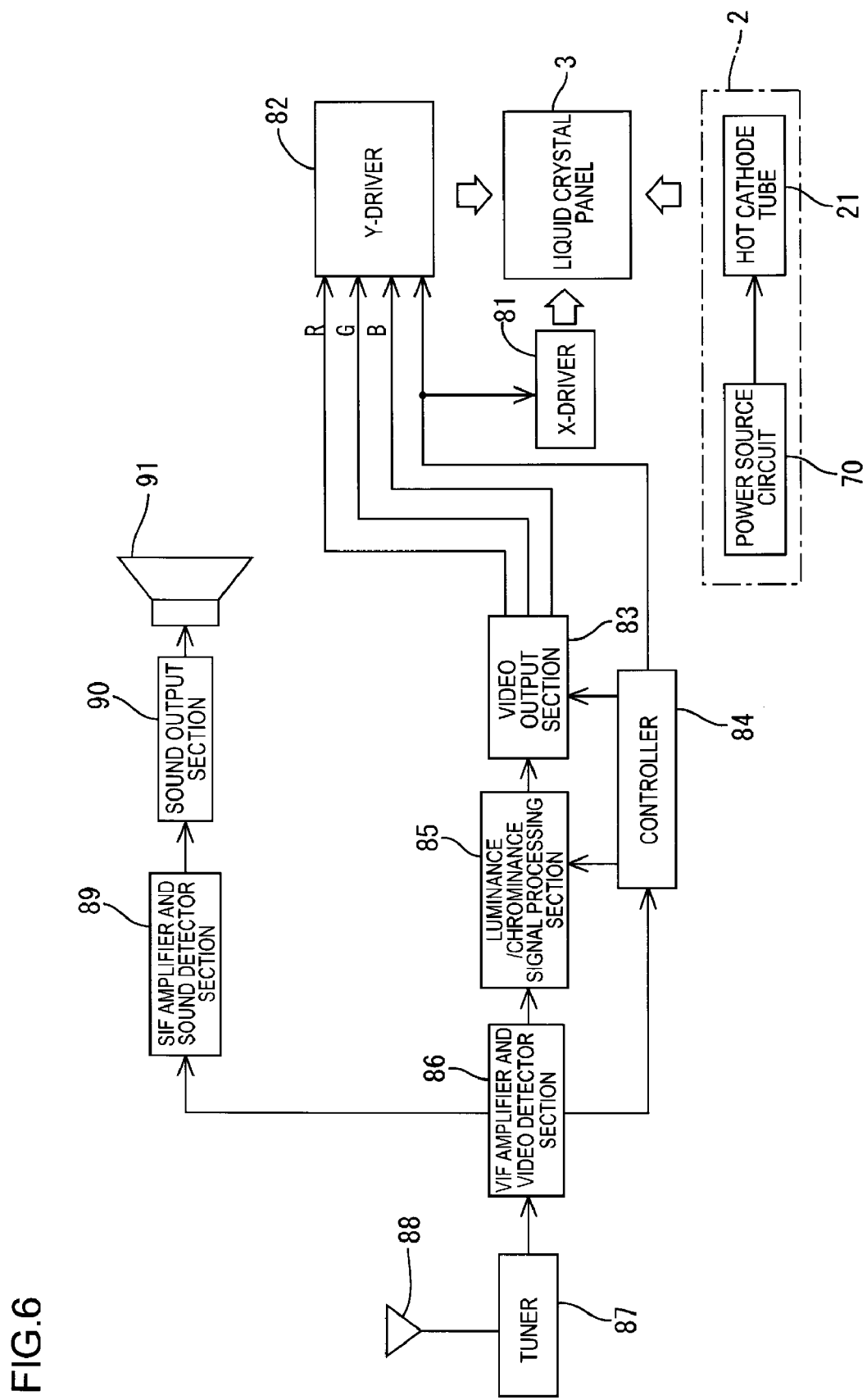

As illustrated in FIG. 6, the liquid crystal display television 100 includes the liquid crystal display 1 having the liquid crystal panel 3 and the backlight device 2, a known antenna 88 for receiving video signals, and a driving device arranged to drive the liquid crystal display 1 based on the signals received at the antenna 88. The driving device preferably includes a VIF amplifier and video detector section 86, a luminance/chrominance signal processing section 85, a video output section 83, a controller 84, and the like.

Connected to the antenna 88 is a known tuner 87. The tuner 87 selects a channel to receive and amplifies the signals. In this case, a super-heterodyne system that converts VHF/UHF video carrier and sound carrier each to intermediate frequencies 58.75 MHz and 54.25 MHz, respectively, is preferably used.

Connected to the tuner 87 is the VIF amplifier and video detector section 86 including a video intermediate frequency amplifier circuit and a video detector circuit. Connected to the VIF amplifier and video detector section 86 are an SIF amplifier and sound detector section 89, as well as the luminance/chrominance signal processing section 85.

The luminance/chrominance signal processing section 85 includes a luminance control circuit, a band-pass amplifier, a chrominance signal demodulation circuit, and a matrix circuit. The video output section 83 is a circuit that alternately outputs R, G, B signals generated in the luminance/chrominance signal processing section 85 to the respective lines.

The controller 84 includes a PLL circuit for generating clocks that is synchronized with horizontal synchronizing signals separated from composite video signals and a countdown circuit for the clocks. The controller 84 is configured to generate various timing pulses that are necessary for a progressive driving.

An X-driver 81 preferably includes a shift resistor circuit. The X driver 81, with start pulses from the controller, drives progressive scanning horizontal bus lines for gates (the direction X) in the panel.

A Y-driver 82 is a modulation and drive circuit that, with video signals, drives vertical (the direction Y) bus lines for sources in the panel. In accordance with control pulses received from the controller 84, the Y-driver 82 holds R, G, B signals received from the video output section 83 for each line, and, according to the RGB pixel arrangement, drives the liquid crystal panel 3 with synchronizing with the scanning of the X-driver 81.

Note that the foregoing configurations of the liquid crystal display and the liquid crystal display television are merely an illustration of an example. Any known configuration may be used for any configuration excepting the backlight device 2.

As explained above, in the foregoing discharge tube, the illumination apparatus for the display device, the liquid crystal display, and the liquid crystal display television include a pair of electrodes 33, 34. The electrodes 33, 34 are supplied with voltage having an alternating component from a power source 70. The electrodes 33, 34 also are supplied with heating current from an electrode heating circuit 38. The illumination apparatus for the display device, the liquid crystal display, and the liquid crystal display television also include a tubular member 23 that accommodates the pair of electrodes 33, 34 therein and temperature sensors 31, 32. The temperature sensors 31, 32 each output a detection signal based the temperatures detected in the respective electrodes. The detection signal is arranged to be provided to a controller 37 that controls the heating current. Therefore, the temperatures in the electrodes of the discharge tube can be more accurately grasped and more properly controlled.

Furthermore, the electrode heating circuit 38 in accordance with the present preferred embodiment includes the DC power source 60 (a heating power source) for supplying heating current to the electrodes 33, 34. Accordingly, application of voltage for electrical discharging and application of current control for heating the electrodes are performed independently from each other. Therefore, the temperatures in the electrodes can be more preferably controlled.

Furthermore, the discharge tube in accordance with the present preferred embodiment is constituted by a hot cathode fluorescent tube 21. Accordingly, higher brilliance can be obtained with comparatively lower voltage. Furthermore, by controlling the temperatures in the electrodes, vaporization and scattering away, as well as sputtering away, of the emitter is prevented. The life of the electrodes is thus significantly increased.

Furthermore, in the present preferred embodiment, each of the temperature sensors 31, 32 preferably includes a thermocouple. Accordingly, the temperatures in the electrodes 33, 34, which are put in the high temperature state, can be preferably detected.

Furthermore, in the present preferred embodiment, both of the temperature sensors 31, 32 are disposed in the tube of the hot cathode fluorescent tube 21. Accordingly, in comparison with a case where they are disposed outside the tube, the temperature sensors 31, 32 can more accurately detect the temperatures in the electrodes without receiving serious affection associated to be caused by external factors.

Furthermore, the electrode 33 includes the pair of leads 33a, 33b extending from the stem provided on one of the ends of the hot cathode fluorescent tube 21 and the filaments 33c bridging the pair of leads 33a, 33b. Likewise, the electrode 34 includes the pair of leads 34a, 34b extending from the stem provided on another end of the hot cathode fluorescent tube 21 and the bridging filament 34c. The temperature sensors 31, 32 are attached to the pair of leads 33a, 33b and the pair of leads 34a, 34b, respectively. Accordingly, the temperatures in the vicinity of the discharging points can be accurately detected without seriously affecting the discharge.

Each of the temperature sensors 31, 32 includes the first temperature detection element attached to one of the pair of leads and the second temperature detection element attached to another one of the pair of leads. The control section 37 is configured to control the heating current based on the average value of the plurality of detected values including the values detected by the first temperature detection elements 31a, 32a and the values detected by the second temperature detection elements 31b, 32b. Accordingly, the temperatures in the electrodes 33, 34 can be reliably detected without variations. Thus, the temperature can be more accurately controlled.

The first temperature detection element and the second temperature detection element of each of the temperature sensors 31, 32 are attached to the pair of leads at the positions adjacent to the filament. Accordingly, the temperatures at the points in vicinity of the filaments where discharge is performed can be more properly detected.

Furthermore, the electrode heating circuit 38 is configured to supply the heating current to both of the electrodes 33, 34, and the electrodes 33, 34 each have the respective temperature sensors 31, 32 attached thereto. The control section 37 controls the heating supplying current to be supplied to the both electrodes 33, 34 based on the values detected by both of the temperature sensors 31, 32 of the electrodes 33, 34. With this configuration, the heating current to be supplied to the both electrodes is controlled with taking the temperatures in the both electrodes 33, 34 into consideration. Therefore, the preferable control with taking the total balance into consideration is enabled.

Second Preferred Embodiment

Figure 7:
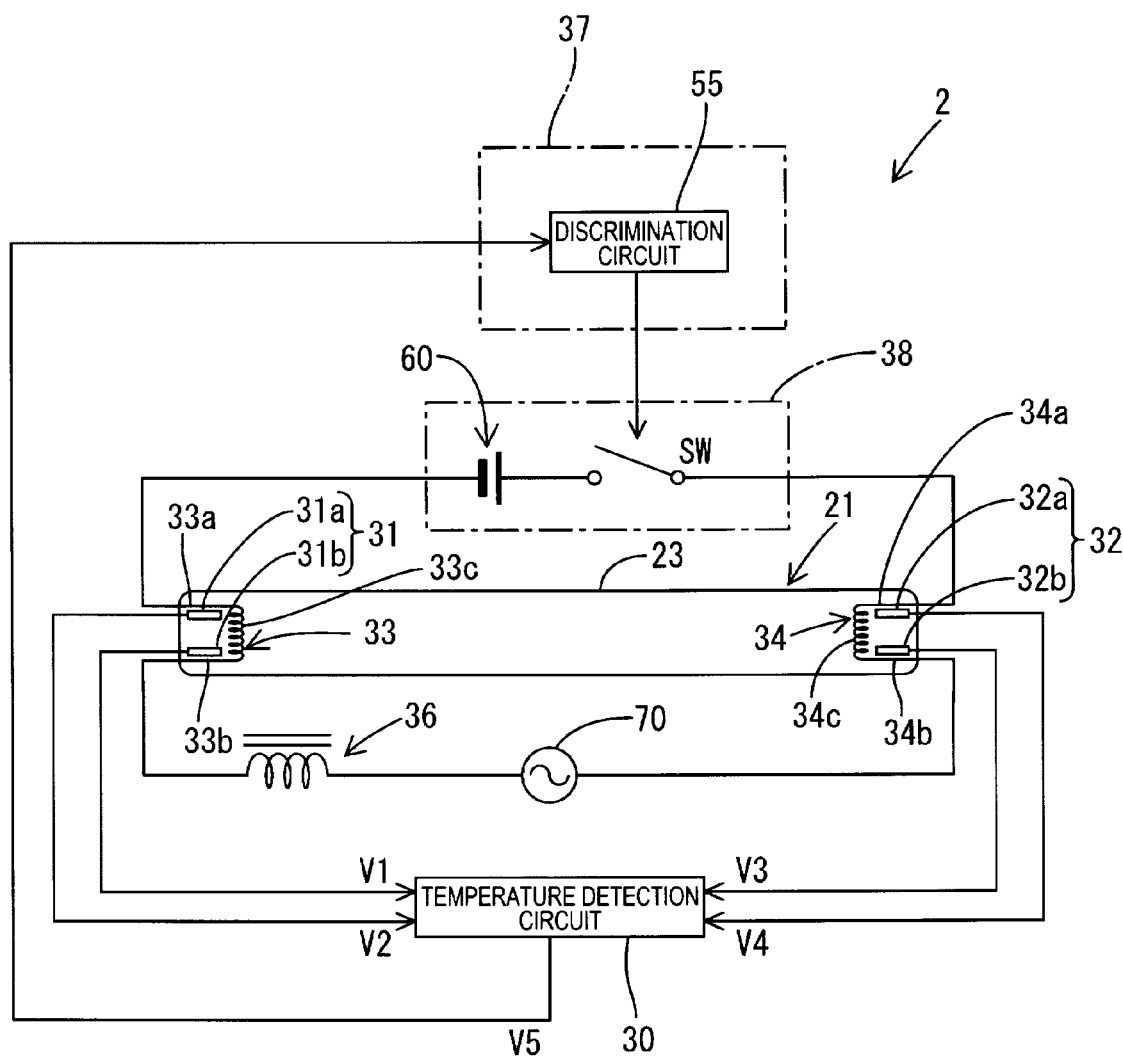
FIG. 7 is a block diagram illustrating an electrical construction of a backlight device in a liquid crystal display device in accordance with a second preferred embodiment of the present invention.

A second preferred embodiment of the present invention will be now explained with reference to FIG. 7.

The present preferred embodiment is different from the first preferred embodiment in the point that the configuration of the control section 37 is modified from the one illustrated in FIG. 2. Other configurations preferably are similar to the first preferred embodiment, and therefore, constructions similar to the first preferred embodiment are designated by the same numerals, while detailed explanations are omitted.

In the present preferred embodiment, the control section 37 is constituted by a discrimination circuit 55. The discrimination circuit 55 is a circuit that discriminates whether or not the temperature indicated by the value outputted from the temperature detection circuit 30 is within a predetermined temperature range. Specifically, a first threshold value corresponding to a lower limit temperature of a target temperature range and a second threshold value corresponding to an upper limit temperature of the same are predetermined. When the average temperature of the temperatures detected by the temperature sensors 31, 32 falls lower than the lower limit temperature (i.e. when the signal from the temperature detection circuit 30 falls lower than the first threshold value), the signals for driving the semiconductor switch SW are outputted, and are continued being outputted until when the average temperature of the temperature detected by the temperature sensors 31, 32 becomes higher than the upper limit temperature. During this duration, the DC power source 60 continues supplying heating current, and the temperatures in the electrodes 33, 34 continues rising. After this duration, when the temperature rises higher than the upper limit temperature (i.e., when the signal V5 reaches the second threshold value), output of the signals for driving the semiconductor switch SW is turned off, and is continued being off until when the temperature falls below the first threshold value. In such a manner, in the present preferred embodiment, a so-called On/Off control is performed. Note that the discrimination circuit 55 may be realized with a window comparator, a CPU, or the like.

Third Preferred Embodiment

Figure 8:
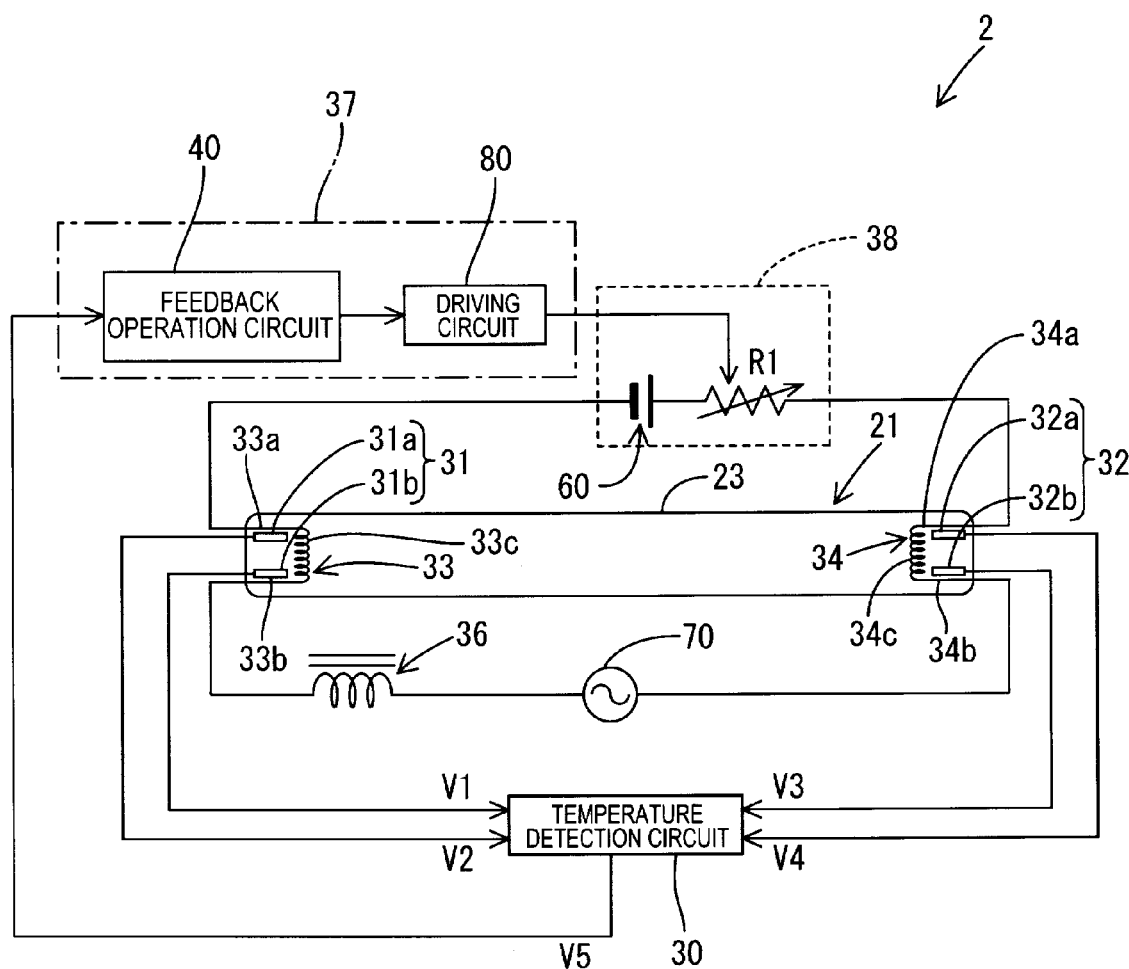
FIG. 8 is a block diagram illustrating an electrical construction of a backlight device in a liquid crystal display device in accordance with a third preferred embodiment of the present invention.

A third preferred embodiment of the present invention will be now explained with reference to FIG. 8.

The present preferred embodiment is different from the first preferred embodiment in the point that the control section 37 and the electrode heating circuit 38 are modified from the ones illustrated in FIG. 2. Other constructions are similar to the first preferred embodiment, and therefore, constructions similar to the first preferred embodiment are designated by the same numerals, while detailed explanations are omitted.

The present preferred embodiment is configured to control a resistance value of a variable resistor R1 based on the average temperature of the temperatures detected by the temperature sensors 31, 32, thereby controlling the amount to be supplied to the electrodes 33, 34. Specifically, similar to the first preferred embodiment, the feedback operation circuit 40 computes the control amount, and a driving circuit 80 controls the variable resistor 38 so that the amount of the current can be in accordance with the control amount.

Other Preferred Embodiments

The present invention is not limited to the foregoing explanation with reference to the drawings; for example, the following preferred embodiments are also included in the scope of the present invention.

(1) In the above-described preferred embodiments, the thermocouples are illustratively used as the temperature sensors. However, any other temperature sensors (thermistors or the like) configured to detect the temperatures may be used instead.

(2) The above-described preferred embodiments are illustratively configured to have the plurality of temperature sensors on each of the electrodes. However, they may be configured to have a single temperature sensor on each of the electrodes.

(3) The above-described preferred embodiments are illustratively configured to have the temperature sensors on each of the electrodes. However, they may be configured to have the temperature sensors on only one of the electrodes.

(4) In the above-described preferred embodiments, the system that drives a single hot cathode tube with a single power source is illustrated. However, the system may be that a plurality of hot cathode tubes are driven with a single power source. In this case, for example, what is necessary is to provide an electrode heating circuit for supplying heating current to the electrodes of all of the hot cathode tubes, while providing the temperature sensors similar to the ones of the above-described preferred embodiments in all of the hot cathode tubes, so that the outputting current from the electrode heating circuit be controlled based on the average value of the temperatures detected by the temperature sensors each.

(5) In the above-described preferred embodiments, the DC power source is illustratively used as the heating power source. However, the heating power source may be constituted by an AC power source.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An electrical discharge tube, comprising:
a pair of electrodes arranged to be supplied with a voltage having an alternating component from a power source and to be supplied with heating current from an electrode heating circuit;
a tubular member that accommodates the pair of electrodes therein; and
a temperature sensor that outputs a detection signal based on the temperature in at least one of the pair of electrodes, the detection signal being arranged to be supplied to a controller that controls the heating current; wherein
the electrical discharge tube is a hot cathode tube;
the temperature sensor includes a thermocouple;
the temperature sensor is disposed in the tubular member;
a stem is provided on each of the ends of the tubular member, at least one of the pair of electrodes includes a pair of leads extending from the stem and a filament bridging the pair of leads, and the temperature sensor is attached to at least one of the pair of leads;
the temperature sensor includes a first temperature detection element to be attached to one of the pair of leads and a second temperature detection element to be attached to another one of the pair of leads; and the temperature sensor is attached to the at least one of the pair of leads at a position adjacent to the filament.

2. An illumination apparatus for a display device, comprising:

an electrical discharge tube including a pair of electrodes;

a power source arranged to apply voltage having an alternating component to at least one of the pair of electrodes;

an electrode heating circuit arranged to supply heating current for heating the pair of electrodes;

a temperature sensor arranged to detect the temperature in at least one of the pair of electrodes to be supplied with the heating current; and a controller arranged to control the heating current based on results detected by the temperature sensor; wherein the electrical discharge tube is a hot cathode tube;

the temperature sensor includes a thermocouple;

the temperature sensor is disposed in the electrical discharge tube;

at least one of the pair of electrodes includes a pair of leads extending from one of stems provided on both ends of the electrical discharge tube and a filament bridging the pair of leads, wherein the temperature sensor is attached to at least one of the pair of leads;

the temperature sensor includes a first temperature detection element attached to one of the pair of leads and a second temperature detection element attached to another one of the pair of leads, wherein the controller controls the heating current based on an average value of a plurality of detected values at least including a value detected by the first temperature detection element and a value detected by the second temperature detection element; and the temperature sensor is attached to at least one of the pair of leads at a position adjacent to the filament.

3. The illumination apparatus for a display device according to claim 2, wherein the electrode heating circuit is configured to supply heating current to both of the pair of electrodes, the temperature sensor is attached to each one of the pair of electrodes, and the controller controls the heating current based on values detected by both of the temperatures on both of the pair of electrodes.

4. A liquid crystal display device, comprising:

an illumination apparatus for a display device; and a liquid crystal panel arranged to display an image using light emitted from the illumination apparatus for the display device; wherein the illumination apparatus for the display device includes:
an electrical discharge tube including a pair of electrodes;

a power source arranged to apply a voltage having an alternating component to at least one of the pair of electrodes;

an electrode heating circuit arranged to supply heating current to heat the at least one of the electrodes;

a temperature sensor arranged to detect a temperature in the at least one of the electrodes supplied with the heating current;

a controller arranged to control the heating current based on a result detected by the temperature sensor;

at least one of the pair of electrodes includes a pair of leads extending from one of stems provided on both ends of the electrical discharge tube and a filament bridging the pair of leads, wherein the temperature sensor is attached to at least one of the pair of leads; and the temperature sensor is attached to at least one of the pair of leads at a position adjacent to the filament.

5. A liquid crystal display television, comprising:

a liquid crystal display device;

a receiving mechanism arranged to receive a video signal; and a driving mechanism arranged to drive the liquid crystal display device based on a signal received by the receiving mechanism; wherein the liquid crystal display device includes:
an illumination apparatus for the display device; and a liquid crystal panel arranged to display an image using light emitted from the illumination apparatus for the display device; wherein the illumination apparatus for the display device includes:
an electrical discharge tube including a pair of electrodes;

a power source arranged to apply a voltage having an alternating component to at least one of the pair of electrodes;

an electrode heating circuit arranged to supply heating current to heat at least one of the electrodes;

a temperature sensor arranged to detect a temperature in the at least one of the electrodes supplied with the heating current;

a controller arranged to control the heating current based on a result detected by the temperature sensor; and at least one of the pair of electrodes includes a pair of leads extending from one of stems provided on both ends of the electrical discharge tube and a filament bridging the pair of leads, wherein the temperature sensor is attached to at least one of the pair of leads; and the temperature sensor is attached to at least one of the pair of leads at a position adjacent to the filament.

* * * * *